United States Patent [19]
Jacobson et al.

[11] Patent Number: 5,574,351
[45] Date of Patent: Nov. 12, 1996

[54] METHOD AND APPARATUS FOR CONTROL OF STEPPER MOTORS

[75] Inventors: Gary S. Jacobson, East Norwalk; Wesley A. Kirschner; Micheal J. Ramadei, both of Trumbull, all of Conn.

[73] Assignee: Pitney Bowes Inc., Stamford, Conn.

[21] Appl. No.: 327,249

[22] Filed: Oct. 21, 1994

[51] Int. Cl.$^6$ ........................................................ H02P 8/00
[52] U.S. Cl. .......................... 318/696; 364/550; 318/685
[58] Field of Search .................................... 318/688, 696, 318/603, 282, 601, 661, 962, 569, 567; 364/550, 563, 474.09, 167.01

[56] References Cited

U.S. PATENT DOCUMENTS

| | | | |
|---|---|---|---|
| 4,258,622 | 3/1981 | Estrabaud et al. | 101/93.01 |
| 4,356,439 | 10/1982 | Mott et al. | 318/685 |
| 4,980,846 | 12/1990 | Chapman | 364/550 |
| 5,032,780 | 7/1991 | Hopkins | 318/696 |
| 5,200,683 | 4/1993 | Taylor et al. | 318/661 |

Primary Examiner—William M. Shoop, Jr.
Assistant Examiner—Karen Masih
Attorney, Agent, or Firm—Ronald Reichman; Robert H. Whisker; Melvin J. Scolnick

[57] ABSTRACT

A plurality of acceleration tables consisting of a sequence of step times defining intervals between steps and thus an acceleration profile to be executed by a stepper motor is stored in a first memory. A step table defining a sequence of excitation patterns for driving a stepper motor is stored in a second table. Identical DMA channels output the step times to a timer and an exitation pattern to a buffer. The timer measures the duration of the step times and when each step time expires generates a trigger signal which initiates the transfer of the next step time and next excitation pattern through the respective DMA channels. The buffer outputs are inverted to form bipolar signals to drive current drivers in accordance with the excitation pattern. The apparatus is initialized by a data processor to select one of the plurality of excitation tables to drive a selected motor. The DMA channel for outputting the acceleration table is initialized for non-repetitive operation and the DMA channel outputting the step table is initialized for cyclic operation. The direction in which the stepper motor is to be driven is determined by the direction in which the step table is accessed.

15 Claims, 2 Drawing Sheets

100

| A | A' | B | B' |
|---|----|---|----|
| 0 | 1  | 0 | 1  |
| 1 | 0  | 0 | 1  |
| 1 | 0  | 1 | 0  |
| 0 | 1  | 1 | 0  |

110

| A | A' | B | B' |
|---|----|---|----|
| 0 | 1  | 0 | 1  |
| 0 | 0  | 0 | 1  |
| 1 | 0  | 0 | 1  |
| 1 | 0  | 0 | 0  |
| 1 | 0  | 1 | 0  |
| 0 | 0  | 1 | 0  |
| 0 | 1  | 1 | 0  |
| 0 | 1  | 0 | 0  |

| STEP TIME 0 |
| STEP TIME 1 |
| ⋮ |
| STEP TIME N-1 |
| STEP TIME N |

METHOD AND APPARATUS FOR CONTROL OF STEPPER MOTORS

BACKGROUND OF THE INVENTION

The subject invention relates to a method and apparatus for control of a stepper motor. More particularly, it relates to a method and apparatus for control of a stepper motor by a data processor through direct memory access channels (hereinafter DMA channels ).

The present application is related to, and shares, common elements of disclosure with, commonly assigned application Ser. No. 08/326,980, (E-258) filed on even date herewith.

Stepper motors are well known in the art and typically comprise motors having a pair of coils each of which may be excited independently in either one of two polarities. By applying an appropriate cyclic sequence of exitation patterns to a stepper motor the motor may be controlled to rotate in predetermined angular increments, or "steps".

By proper selection of the appropriate cyclic sequence of exitation patterns (hereinafter referred to as a "step table") a stepper motor may be operated in one of a plurality of modes of operation. These modes include a full-step mode where one of the two motor coils changes polarity at each step repeating the sequence of exitation patterns through a four step step table, and a half-step mode wherein one or the other of the two motor coils is selectively de-energized at various steps of an eight step table to rotate the stepper motor in half steps. Other modes of operation of stepper motors are known, but need not be discussed further here for an understanding of the subject invention.

Stepper motors have proven very popular in modern, sophisticated mechanical equipment since, by varying the time between steps in a step table, a stepper motor may be driven through very flexible and highly precise velocity profiles necessary to implement complex mechanical functions such as those carried out by paper handling equipment. To achieve this flexibility in sophisticated applications it has generally been the case that a stepper motor would be controlled by a data processor such as a microprocessor. However, direct program control of a stepper motor by a data processor is a computationally intensive task which will consume an unacceptably large portion of the computational capabilities of a data processor, particularly of a microprocessor.

Accordingly, it is an object of the subject invention to provide a method and apparatus which will reduce the computational burden on a data processor controlling a stepper motor while still allowing highly flexible control of the stepper motor.

BRIEF SUMMARY OF THE INVENTION

The above object is achieved and the disadvantages of the prior art are overcome in accordance with the subject invention by means of a method and apparatus wherein a first memory is provided for storing a step time table which includes a sequence of step times defining a velocity profile for a stepper motor. (By "step time"herein is meant a numeric value which defines the interval between successive steps for a stepper motor in terms of a corresponding number of system clock pulses. ) A first DMA channel accesses the first memory to output the sequence of step times, and a timer receives the step times from the first DMA channel and generates a sequence of trigger signals corresponding to expiration of the intervals defined by the step times. A second memory stores a step table defining a sequence of exitation patterns for driving a stepper motor and a second DMA channel accesses the step table to output a second sequence of the exitation patterns to drive the stepper motor.

In operation the first DMA channel responds to the trigger signals to output the sequence of step times until the sequence is complete and the second DMA channel is responsive to the trigger signals to output the cyclic sequence of exitation patterns. The timer is responsive to input of each of the step times to begin timing the duration of the interval defined by that step time, and the apparatus is responsive to a data processor to initiate execution of the acceleration profile defined in the step time table.

Those skilled in the art will recognize that while the subject invention has been described in terms of two memories these memories may be separate portions of a single memory device and will preferably be located in the same address space.

In accordance with one aspect of the subject invention the first memory stores a plurality of step time tables corresponding to plurality of velocity profiles and the first DMA channel responds to signals from a data processor to select one of the step time tables.

In accordance with another aspect of the subject invention the second memory stores a plurality of step tables defining a corresponding sequence of exitation patterns and the second DMA channel is responsive to signals from a data processor to select one of the step tables for driving a stepper motor in a corresponding mode of operation.

Thus, it can be seen that the subject invention achieves the above object and advantageously overcomes the disadvantages of the prior art. Other objects and advantages of the subject invention will be apparent to those skilled in the art from consideration of the attached drawings and the detailed description set forth below.

DETAILED DESCRIPTION OF PREFERRED EMBODIMENTS OF THE INVENTION

Figure 1:
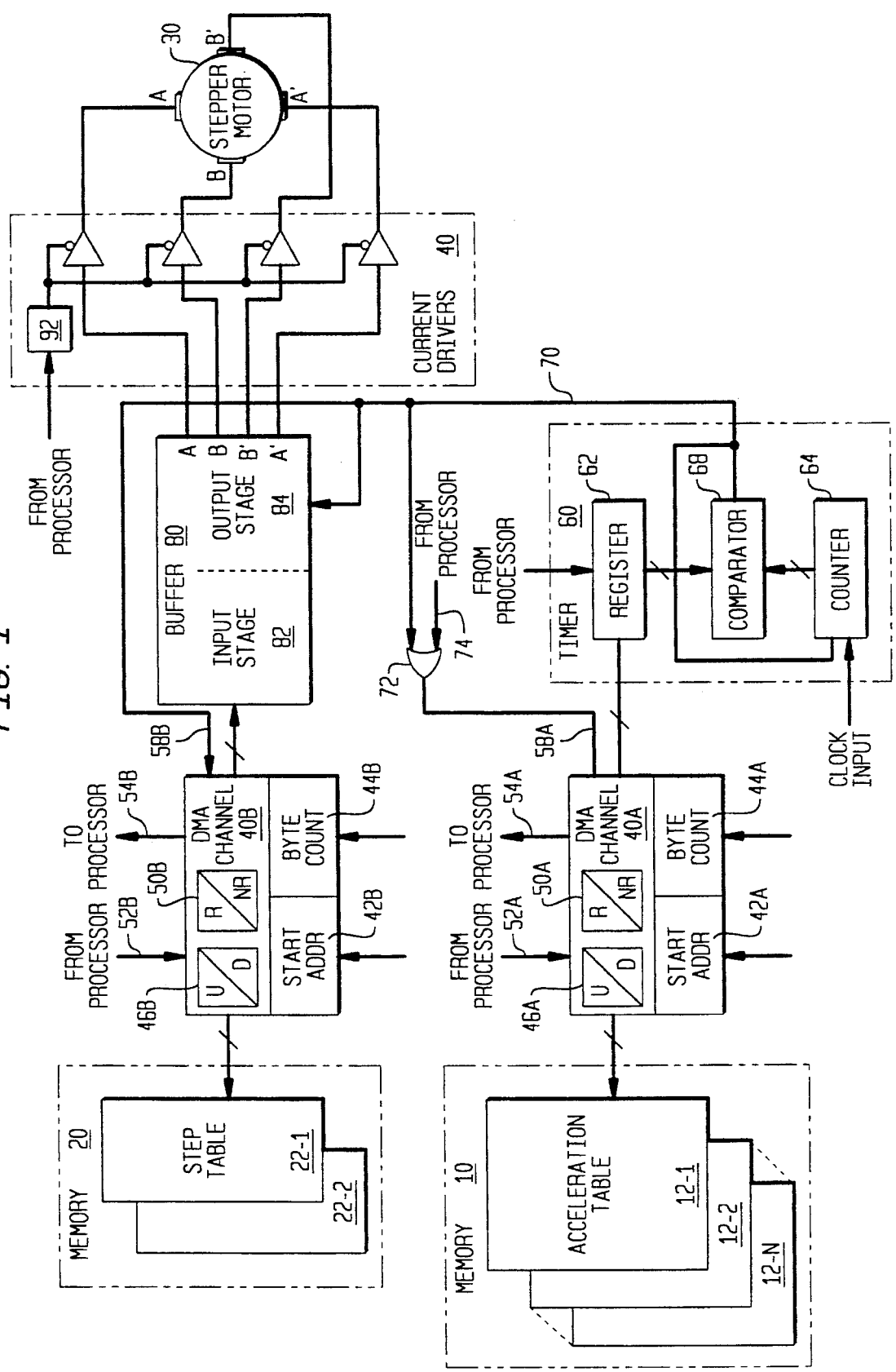
FIG. 1 shows a schematic block diagram of an apparatus in accordance with the subject invention.

FIG. 1 shows a block diagram of a preferred embodiment of the subject invention. Memory 10 stores a plurality of step time tables 12-1 through 12-N. Memory 20 stores two step tables 22-1 and 22-2. Preferably, step tables 22-1 and 22-2 define full-step and half-step modes of operation for stepper motor 30 as will be described further below. Identical DMA channels 40A and 40B are connected to memory 10 and memory 20 respectively to access selected step time tables and selected step tables.

Each of channels 40A and 40B includes a start address register 42A, 42B a byte count register 44A, 44B and up/down flag 46A, 46B and a repeat/non-repeat flag 50A, 50B. Each of DMA channels 40A and 40B operates in a manner well known to those skilled in the art to transfer blocks of data from memory without the need for direct program control by a data processor. Once initialized and started DMA channels 40A and 40B will transfer a block of data beginning with the start address defined in registers 42A or 42B and continuing sequentially until the number of bytes defined in registers 44A or 44B is reached. Channels 40A and 40B also include an input from a data processor 52A and 52B for initializing the channels and outputs to the data processor 54A and 54B to signal the data processor when the block has been transferred. Depending upon the state of flags 46A and 46B channels 40A and 40B will either increment or decrement the address accessed. Depending upon the state of flags 50A and 50B channels 40A and 40B will either repeat output of the data block cyclically or will halt once the byte count in registers 44A or 44B is reached. Channels 40A and 40B also include next byte inputs 58A and 58B to initiate and continue operation.

Channel 40A loads the sequence of step times from the selected step time table, here shown as table 12-1 into register 62 of timer 60. When comparator 68 detects equality between register 62 and counter 64 timer 60 generates a trigger signal on line 70. Each time a trigger signal is generated counter 64 is reset and begins counting upwards driven by a system clock (not shown).

The trigger signals are fed back to DMA channel 40A through "or"gate 72 to cause channel 40A to access the next address in step time table 12-1 and load the next step time into register 62.

As can be seen channel 40A and timer 60 cooperate to generate a sequence of trigger signals which are separated by intervals defined, in terms of numbers of system clock pulses, by the sequence of step times in step time table 12.

To initiate execution of a step time table a data processor (not shown) sends a signal on input 74 of gate 72 to channel 40A to transfer the first step time in the step time table.

Line 70 is also connected to input 58B of DMA channel 40B to initiate transfer of the next exitation pattern in step table 22-1 and to input stage 82 of buffer 80. At the same time the trigger signals cause the previous contents of input stage 82 to be transferred to output stage 84 and applied to current drivers 90.

Use of a double buffer for buffer 80 assures that output stage 84 will always be updated, and the exitation pattern applied to stepper motor 30 changed, synchronously with the trigger signals on line 70.

Preferably drivers 90 include a latch 92, which operates under the direct program control of a data processor, for disabling drivers 90 to turn motor 30 off.

Figures 2, 3:
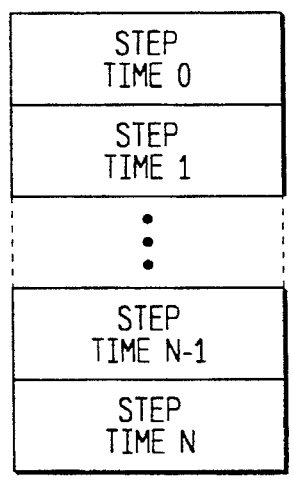
FIG. 2 shows representations of a pair of step tables for two modes of operation of a stepper motor.
FIG. 3 shows a representation of a step time table in accordance with the subject invention.

Turning to FIG. 2 a full-step step table 100 and a half-step step table 110 are shown. In table 100 signal pairs A and A', and B and B' each consist of two complimentary signals. At each step of table 100 one of the pairs, A and A', or B and B', changes thus reversing the polarity of the signal applied to the corresponding coil of stepper motor 30. The four steps of table 100 thus include all possible combinations of the signals A and A', and B and B'and drive stepper motor 30 in full steps in a manner well known by those skilled in the art.

Table 110 interpolates four additional steps to create an eight step table. The interpolated steps de-energize one of the coils of motor 30 by setting the corresponding pair of signals both to a zero value before reversing the polarity of that coil on the next step. By interpolating these de-energizing steps table 100 causes motor 30 to be drive in half-steps in a manner well known to those skilled in the art.

FIG. 3 shows a step time table consisting of a sequence of numerical values representative of the defined time between successive steps of motor 30. Note that step time zero must expire before the first exitation pattern is loaded into input stage 82 and step time 1 must expire before the first exitation pattern is loaded into output stage 84. This implies a minimum delay of approximately five microseconds. Of course it would be a simple matter to design the apparatus of FIG. 1 so that the step table was immediately accessed when the apparatus was started by the data processor but a five microsecond delay (at the preferred operating frequency of 40 KHz) is acceptable in substantially all mechanical operations. The present design also allows incorporation of longer delays where desirable.

Thereafter channel 40A will sequentially access each step in the step time table until the last step is output. Because channel A is normally initialized for non-repetitive operation it will then stop; through repetitive access to a step time table for cyclic operation of a stepper motor is within the contemplation of the subject invention.

Those skilled in the art will recognize that is frequently desirable to continue to slew a stepper motor after it has been accelerated to a desired speed. This can be achieved by directly loading register 62 with a desired value to define the slew rate. (By "slew"herein is meant operation of a motor at a constant velocity for an indeterminate period.) Typically, the processor will then stop the motor by loading register 62 with a zero value which will halt timer 60. In a preferred embodiment of the subject invention register 62 may be designed to retain the last value in the step time table so that motor 30 will slew at the final non-zero step time of the step time table.

To initialize operation of the apparatus of FIG. 1 the data processor firsts sets flag 46A for either up or down access to the selected step time table. This value of flag 46A will typically remain unchanged since all step time tables are preferably to be read in the same direction. The data processor normally also sets flag 50A for non-repetitive operation.

The data processor then initializes channel 40B with an appropriate starting address in register 42B and byte count in register 44B and sets flag 50B for repetitive operation.

To access a selected step time table the data processor then loads registers 42A and 44A with the appropriate starting address and byte count and sets flag 46B to appropriately determine the direction of rotation of motor 30. The data processor need then only apply the appropriate signal on input 74 to transfer the first step time in the step time table and initiate execution of the selected step time table in the manner described above.

It should be noted that the mode of operation could be selected at the same time as the step time table, however it is anticipated that the mode of operation of a motor will change relatively infrequently and it is therefore believed preferable to include selection of the mode in the initialization of the apparatus.

In a preferred embodiment the DMA channels, times, memory and buffers necessary to practice the subject invention are integrated, together with a processor in a single integrated circuit intended for control applications, such as the commercially available H83000/3 microprocessor, and can be configured to implement an embodiment of the subject invention under software control.

The above descriptions have been provided by way of illustration only and numerous other embodiments of the subject invention will be apparent to those skilled in the art from consideration of the detailed description set forth above and the attached drawings. Limitations on the scope of the subject invention are therefore to be found only in the claims set forth below.

What is claimed is:

1. An apparatus for control of a stepper motor by a data processor, said apparatus comprising:
   a. a first memory for storing a step time table comprising a sequence of step times defining a velocity profile for said stepper motor;
   b. a first DMA channel for sequentially accessing said first memory to output said sequence of step times;
   c. a timer for receiving said step times from said first DMA channel and for generating a sequence of trigger signals, corresponding to expiration of intervals defined by each of said step times;
   d. a second memory for storing a step table defining a sequence of exitation patterns for driving said stepper motor;
   e. a second DMA channel for repetitively accessing said step table to output a cyclic sequence of said exitation patterns to drive said stepper motor; wherein
   f. said first DMA channel is responsive to said trigger signals to output said sequence of step times;
   g. said second DMA channel is responsive to said trigger signals to output said cyclic sequence of said exitation patterns;
   h. said timer is responsive to input of said step times to begin timing the duration of said intervals; and,
   i. said apparatus is responsive to said data processor to initiate exitation of said acceleration profile.

2. An apparatus as described in claim 1 wherein said first memory stores a plurality of step time tables defining a corresponding plurality of velocity profiles and said first DMA channel is responsive to said data processor to select one of said step time tables.

3. An apparatus as described in claim 1 wherein said timer is directly connected to said data processor to receive additional step times directly from said data processor; whereby said stepper motor can be operated under direct program control by said data processor after execution of said velocity profile.

4. An apparatus as described in claim 1 wherein said timer retains a last value received from said first DMA channel after execution of said velocity profile and thereafter repetitively generates said trigger signals at constant intervals equal to said last step time; whereby said stepper motor slews at a constant final velocity determined by said velocity profile.

5. An apparatus as described in claim 1 wherein said second memory stores a plurality of step tables defining a corresponding sequence of exitation patterns and said second DMA channel is responsive to said data processor to select one of said step tables for driving said stepper motor in a corresponding mode of operation.

6. An apparatus as described in claim 5 wherein said second DMA channel is selectively initialized to either increment or decrement a current address when accessing said step tables; whereby said stepper motor is selectively driven in either a forward or reverse direction.

7. An apparatus as described in claim 1 further comprising;
   a. a buffer for receiving and temporarily storing the output of said second DMA channel; and
   b. current drivers connected to outputs of said buffers for energizing said stepper motor in accordance with an exitation pattern stored in said buffer.

8. An apparatus as described in claim 7 wherein said buffer comprises an input stage and an output stage, and said buffer responds to said trigger signals to transfer an exitation pattern from said input stage to said output stage; whereby said stepper motor is synchronized with said trigger signals.

9. An apparatus as described in claim 7 further comprising a means for disabling said drivers, said means being responsive to said data processor for enabling or disabling said drivers under direct program control.

10. A method of controlling a stepper motor comprising the steps of:
    a. storing a step time table comprising a sequence of step times defining an velocity profile in a first memory;
    b. storing a step table defining a sequence of exitation patterns for driving said stepper motor in a second memory;
    c. outputting a first step time from said step time table;
    d. timing the duration of each of said step times as it is output and generating a trigger signal corresponding to expiration of each of said step times;
    e. responding to said trigger signals to sequentially output a next of said step times from said step time table and to cyclically output a next of said exitation patterns from said step table.

11. A method as describe in claim 10 comprising the further steps of:
    a. storing at least one additional step time table to form a plurality of step time tables; and
    b. selecting one of said plurality of step time tables and outputting said first step time and said next step times from said selected table.

12. A method as described in claim 10 comprising the further steps of, after completion of said acceleration profile:
    a. halting output of said step times;
    b. continuing to output said trigger signals at constant intervals approximately equal to a last step time of said velocity profile; and
    c. continuing to respond to said trigger signals to output said exitation pattern; whereby said stepper motor slews at a constant rate.

13. A method as described in claim 10 comprising the further steps of:
    a. storing at least one additional step table to form a plurality of step tables for driving said stepper motor in a corresponding plurality of modes of operation; and
    b. selecting one of said step tables prior to operating said stepper motor.

14. A method as described in claim 13 comprising the further step of selecting a direction in which to access said selected step table, whereby said stepper more is selectively driven in either a forward or reverse direction.

15. A method as described in claim 10 wherein said exitation patterns are output to said stepper motor synchronously with said trigger signals.

* * * * *